June 22, 1948.  G. A. TINNERMAN  2,443,752
FASTENING DEVICE
Filed June 27, 1944  2 Sheets-Sheet 1
Fig. 1
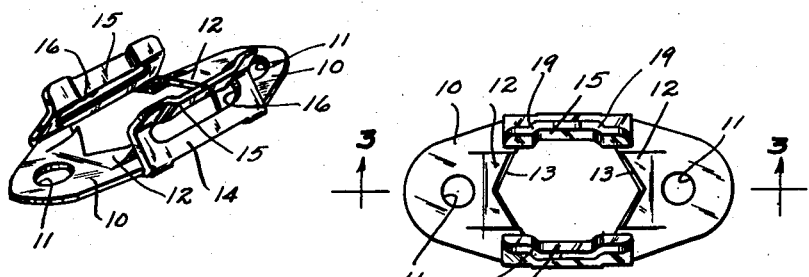
Fig. 3
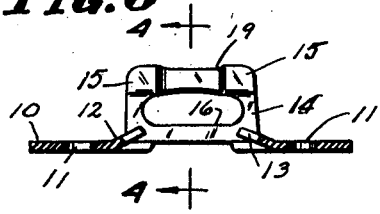
Fig. 4
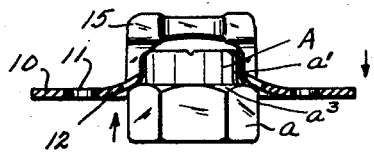
Fig. 6
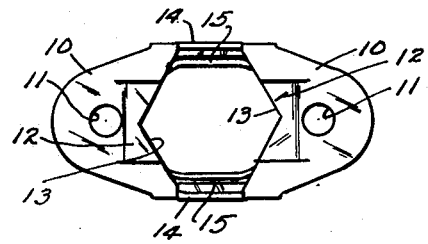
Fig. 5
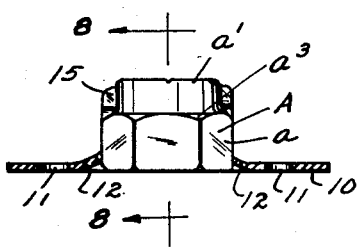
Fig. 7
INVENTOR.
GEORGE A. TINNERMAN
BY
Bates, Teare, & McBean
ATTORNEYS June 22, 1948.　　　G. A. TINNERMAN　　　2,443,752
FASTENING DEVICE
Filed June 27, 1944　　　　　　　　　　2 Sheets—Sheet 2
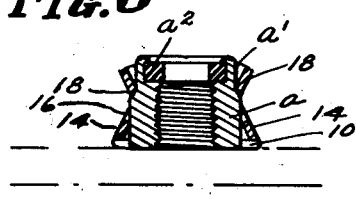
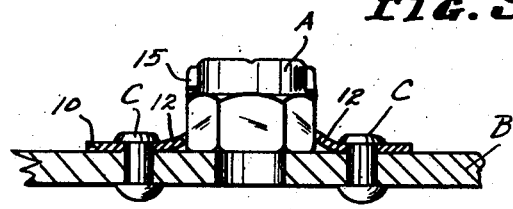
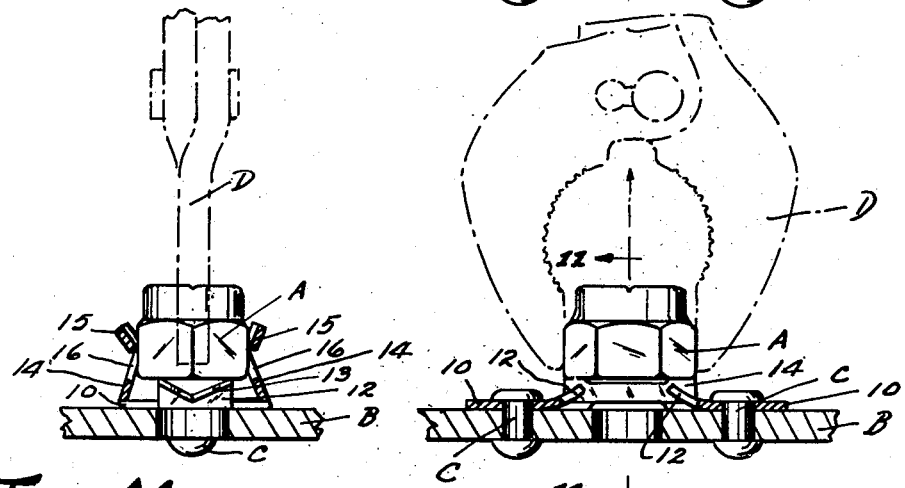
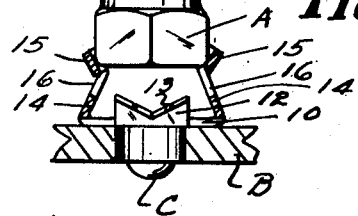
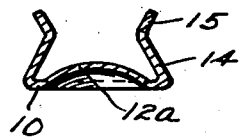
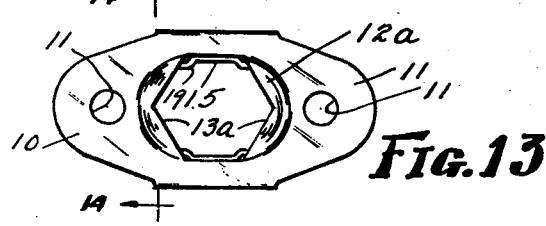
INVENTOR.
GEORGE A. TINNERMAN
BY
Bates, Teare & McBean
ATTORNEYS Patented June 22, 1948

2,443,752

UNITED STATES PATENT OFFICE 2,443,752

FASTENING DEVICE

George A. Tinnerman, Cleveland, Ohio, assignor to Tinnerman Products, Inc., Cleveland, Ohio, a corporation of Ohio Application June 27, 1944, Serial No. 542,357

11 Claims. (Cl. 85—32)

This invention relates to a fastening device comprising a nut anchor adapted to embrace the angular exterior of a nut and be attached to a suitable support, whereby the nut is retained in place and prevented rotating as its bolt is turned. An object of the invention is to provide such a device made of a single piece of resilient sheet material adapted for ready attachment to a support and formed to engage effectively opposed angular faces of the nut. Another object of the invention is to provide such a nut anchor formed with resilient means to hold the nut down on the support while enabling it to be readily withdrawn by an application of proper force.

The means by which I accomplish the above objects, and other advantageous features, will be apparent from the following description of preferred embodiments shown in the drawings.

Fig. 1 is a perspective of my nut anchor in an approved form; Fig. 2 is a plan thereof; Fig. 3 is a longitudinal section, as indicated by the line 3—3 on Fig. 2; Fig. 4 is a transverse section, as indicated by the line 4—4 on Fig. 3; Fig. 5 is a bottom plan of this embodiment of the invention; Fig. 6 is a longitudinal section showing the anchor in the act of being applied to the nut; Fig. 7 is a similar view showing the anchor in final position on the nut; Fig. 8 is a cross section of the anchor and embraced nut, e. g. a cross section on the line 8—8 on Fig. 7; Fig. 9 is a longitudinal section, showing the anchor riveted to a suitable support; Fig. 10 is a view of the mounted device of Fig. 9, showing the nut in the act of being extracted by suitable tool from the anchor; Fig. 11 is a vertical cross section on the line 11—11 of Fig. 10; Fig. 12 is a view illustrating the manual positioning of the nut in the anchor when attached to a support; Fig. 13 is a bottom plan of a modified form of the nut anchor; Fig. 14 a cross section in the plane indicated by the line 14—14 in Fig. 13.

In various figures, A indicates any suitable nut having an angular exterior with which my anchoring device is adapted to coact. As shown, the nut is hexagonal for the most part (indicated at $a$) but has a cylindrical upper portion $a'$. If desired, the nut may be of the type having a yielding washer or nut lock within the cylindrical portion, as indicated at $a^2$ in Fig. 8. Hexagonal nuts usually have rounded top surfaces adjacent the corners, and this is especially true with a castellated nut or a nut containing an elastic lock. Such round surface is shown in the drawing at $a^3$, and my anchorage device, in the form shown, coacts with it, giving the spring retention desired, as about to be explained.

My anchorage device comprises a single piece of resilient sheet material, preferably spring steel, formed to present the following portions, as shown particularly in Figs. 1-5, namely:

A flat base portion 10 of elongated, preferably approximately elliptical form, and provided with openings 11 for the passage of rivets or bolts; a pair of shoulders bent upwardly at an acute angle to the base and having their ends formed to engage flat faces of the nut, and a pair of side wings bent up from the intermediate region of the longitudinal edges of the base, then bent inwardly and then outwardly to provide shoulders to coact with the top of a shoulder on the nut.

In the form shown in Figs. 1 to 12 the shoulders which engage the nut are made by a pair of tongues 12 partially severed from the base by parallel slits. In the form shown in Figs. 13 and 14 the shoulders are provided by a spherical bending upwardly of the material of the base without slitting it, as indicated at 12a in those figures.

If the nut is hexagonal, as shown, the ends of the tongues 12 or raised portions 12a are recessed in V-shape, as indicated at 13 or 13a, so that each end surface may engage two adjacent faces of the nut, thereby effectively preventing it rotating relative to the base.

The wings, in each embodiment, are formed with inwardly inclined portions 14 extending for the major distance to the top and then with outwardly directed portions 15. A longitudinal opening 16 is made through the upper region of the inwardly directed portion 14, which provides an accessible lower edge for the top cross member 15 of the wing, which cross member is thus adapted to engage the shoulder at the upper end of the angular faces of the nut, which extend into the openings, as shown in Fig. 8. The wings thus serve to hold the nut down on the support beneath the base. Incidentally, the opening 16 allows the upper portion of the wing to be readily bent outwardly in forming the device.

The top cross bar 15 of each wing is outwardly offset intermediately, as shown at 19, thus stiffening the cross bar and providing further that while it engages the shoulder above one of the flat sides of the nut, there also results somewhat abrupt downwardly facing corners of the wing which overlap the nut at corners where two flat sides join. The result is that the wings obtain a sufficiently firm hold on the nut to prevent any inadvertent displacement thereof, while allowing the nut to be removed when desired, such rounded top surface camming the wings outwardly.

Ordinarily the anchor is shoved downwardly over the nut, or the nut is shoved upwardly into the anchor, before they are mounted on a support. Thus, Fig. 6 indicates the intermediate position, where the anchor is supposed to be moving downwardly or the nut upwardly as the case may be, with the result that the two come into the relative position shown in Fig. 7. In this position the anchor may be readily attached to a support. Figs. 8 to 12 indicate a support B, the anchor being attached thereto by rivets C, holding the nut ready to receive its bolt.

If it be desired to mount the nuts on their bolts before the anchors are put in place, that method may be employed with equal facility with my anchor, which is then merely placed over the positioned nut and the rivets or other fastenings thereafter applied.

However applied, the top cross bars 15 of the wings engaging the shoulders on the nut hold it down against the support while the engagement of the ends of the raised portion with the angular faces of the nut prevent it rotating.

On some occasions it is desirable to remove the nut from the attached anchor without disturbing the relation of the anchor to the support. This is readily accomplished in my spring anchor due to the yielding character of my retaining wings. It is merely necessary to apply sufficient force to move the nut away from the support, allowing it to cam the wings outwardly until the nut is freed. This force may readily be applied by a suitable tool engaging opposite edges of the nut as, for instance, the jaws of a pair of pincers, indicated at D in Figs. 10 and 11. My anchorage allows ample space above the shoulders 12 or 12a for such a tool to engage and clamp the nut, then by a proper jerk the nut may be pulled free from the anchor.

To replace a withdrawn nut without disturbing the anchor, it is merely necessary to rest it on the outwardly inclined cross members 15 and manually press downwardly on it, as indicated in Fig. 12. In such action the nut cams the wings outwardly and thus passes downwardly into position, where it is engaged by the tongues to prevent rotation and by the wings yieldingly to prevent inadvertent withdrawal.

It will be seen that my anchor is a simple device which may be readily attached to a support and will have the desired effect of preventing rotation of the embraced nut and holding it normally against the support in the absence of the bolt, but allowing it to be withdrawn and replaced whenever desired. Furthermore, it is adapted for having the nut inserted in the anchor and the nut and anchor mounted as a unit or for being put in place on a nut already positioned, or if desired, being put in place in the absence of the nut, and the nuts thereafter sprung into position.

I claim:

1. A fastening device comprising an elongated base having an opening through it, a pair of raised portions of the base at opposite ends of the opening having V-notches in their ends, and a pair of wings formed at the sides of the base and adapted to engage shoulders on a nut.

2. A nut anchor comprising a base having an opening adapted to be occupied by a nut, means carried by the base adapted to engage the nut and prevent its rotation, and a pair of wings extending upwardly from the base and inclining inwardly and then outwardly and adapted to maintain a spring engagement with the nut.

3. A nut anchor comprising a substantially flat elongated base having an opening to be occupied by a nut, means on the base at opposite ends of the opening adapted to engage the nut and prevent rotation of it, a pair of wings formed on opposite sides of the base and extending upwardly and inwardly for a distance and then upwardly and outwardly, the inwardly extending region of each wing being formed with an elongated opening to enable the outwardly extending region to provide a shoulder to engage a nut entering such opening in the lower portion of the wing.

4. A nut anchor made of a single piece of resilient sheet material formed with a substantially flat elongated base having a central opening for the passage of a nut and a pair of raised portions extending toward the opening and having V-notches in their ends, whereby they may engage and prevent rotation of a hexagonal nut resting on the support on which the base rests, said base having openings beyond the raised portions for the passage of rivets or other fastening members, the side portions of the device being bent upwardly from the base to provide one region inclining inwardly and another region inclining outwardly, there being an elongated opening through each inwardly directed region adjacent the lower edge of the outwardly directed region.

5. A nut anchor comprising a base and a pair of side wings bent upwardly from the base to provide one region inclining inwardly and another region inclining outwardly, there being an elongated opening through the inwardly directed region and the outwardly directed region being intermediately offset outwardly.

6. A nut anchor made of a single piece of resilient sheet material formed with a substantially flat elongated base having a central opening for the passage of a nut, a pair of tongues partially severed from the base and extending longitudinally toward the opening and inclining upwardly and having V-notches in their ends, whereby they may engage and prevent rotation of a hexagonal nut resting on the support on which the base rests, the side portions of the device being bent upwardly from the base to provide one region inclining inwardly and another region inclining outwardly, there being an elongated opening through each inwardly directed region adjacent the lower edge of the outwardly directed region.

7. A nut anchor made of a single piece of resilient sheet material formed with a substantially flat elongated base having a central opening for the passage of a nut, the base at opposite ends of the nut opening being bowed upwardly in substantially spherical form, such portions having V-notches in their ends, whereby they may engage and prevent rotation of a hexagonal nut resting on the support on which the base rests, the side portions of the device being bent upwardly from the base to provide one region inclining inwardly and another region inclining outwardly, there being an elongated opening through each inwardly directed region adjacent the lower edge of the outwardly directed region.

8. The combination, with a hexagonal nut having a gradually rounded top surface leading to the outer edges of the nut, of a fastening device comprising a base adapted to be attached to a support and having an opening as large as the exterior of the nut, said base being provided with means to engage opposite flat faces of the nut and provided also with a pair of upwardly extending wings adapted to inwardly overhang the curved top of the nut in a yielding manner to hold the nut normally down on the support to which the base is attached, while allowing the nut to be withdrawn directly away from the base and between the wings by the application of sufficient force.

9. The combination, with a hexagonal nut having a cylindrical extension and gradually rounded surfaces connecting the bottom of the extension with the outer edges of the nut, of a fastening device of resilient sheet material comprising a base adapted to be attached to a support, said base being provided with a pair of raised portions with V-notched ends to engage opposite flat faces of the nut and provided also with a pair of upwardly extending spring wings alternating in position with the raised portions and adapted to inwardly overhang the curved top of the nut adjacent the junction of its cylindrical extension with the sides in a yielding manner.

10. A nut anchor comprising a base and a pair of side wings bent upwardly from the base to provide one region inclining inwardly and another region inclining outwardly, there being an elongated opening through the inwardly directed region at the lower edge of the outwardly directed region to expose such edge.

11. A nut anchor made of a single piece of resilient sheet material comprising a base having an opening for the axial movement of a nut, the material of the base being bowed upwardly without severance in regions along sides of the nut opening and adjoining such opening to provide surfaces adapted to engage the nut to prevent the nut rotating relative to the base, spring wings carried by the bowed portions of the base and adapted to yieldingly engage shoulders on the nut.

GEORGE A. TINNERMAN.

REFERENCES CITED

The following references are of record in the file of this patent:

UNITED STATES PATENTS

| Number | Name | Date |
|---|---|---|
| 1,261,146 | Marble | Apr. 2, 1918 |
| 1,915,088 | Eastburg | June 20, 1933 |
| 2,304,107 | Leisure | Dec. 8, 1942 |
| 2,330,372 | Mittendorf | Sept. 28, 1943 |

FOREIGN PATENTS

| Number | Country | Date |
|---|---|---|
| 492,686 | Great Britain | Sept. 26, 1938 |